United States Patent [19]

Lytton

[11] Patent Number: 5,380,357

[45] Date of Patent: Jan. 10, 1995

[54] WATER SOLUBLE CRAYON COMPOSITION AND METHOD

[75] Inventor: Richard N. Lytton, Naperville, Ill.

[73] Assignee: La-Co Industries, Inc., Chicago, Ill.

[21] Appl. No.: 101,919

[22] Filed: Aug. 4, 1993

[51] Int. Cl.[6] ............................................. C09D 13/00
[52] U.S. Cl. ................... 106/19 B; 106/27 R
[58] Field of Search ........................ 106/19 B, 27 R

[56] References Cited

U.S. PATENT DOCUMENTS

| | | | |
|---|---|---|---|
| 2,623,827 | 12/1952 | Moos | 106/23 R |
| 2,835,604 | 5/1958 | Aronberg | 106/19 B |
| 2,841,079 | 7/1958 | Dulfer | 106/19 R |
| 3,249,448 | 5/1966 | Coburn et al. | 106/31 R |
| 3,409,574 | 11/1968 | Gros | 106/19 R |
| 3,627,546 | 12/1971 | Coppeta | 106/21 A |
| 3,672,842 | 6/1972 | Florin | 106/19 B |
| 3,935,731 | 2/1976 | Alburger | 106/19 R |
| 3,993,492 | 11/1976 | Woolly | 106/19 A |
| 4,158,648 | 6/1979 | Meadus et al. | 106/19 R |
| 4,212,676 | 7/1980 | Ueda | 106/19 B |
| 4,212,786 | 7/1980 | Murakami | 106/19 B |
| 4,840,669 | 6/1989 | Hughes et al. | 106/19 B |
| 4,978,390 | 12/1990 | Snedeker | 106/19 B |
| 5,084,098 | 1/1992 | Olson | 106/19 B |
| 5,084,493 | 1/1992 | Olson et al. | 523/164 |
| 5,261,952 | 11/1993 | Craig | 106/19 B |

FOREIGN PATENT DOCUMENTS

58-134166 10/1983 Japan.

*Primary Examiner*—Helene Klemanski
*Attorney, Agent, or Firm*—Wallenstein, Wagner & Hattis

[57] ABSTRACT

The present invention relates to an improved water soluble crayon composition comprised of at least one ethoxylated alcohol; optionally, at least one water soluble material selected from the group consisting of an ethoxylated sorbitan fatty acid ester, ester derivatives thereof, phenols and polymeric derivatives; at least one pigment or dye; and, optionally, at least one filler. The improved crayon composition does not contain polyethylene glycols and, thus, exhibits little or no ghosting or residue left on a surface when washed with water.

30 Claims, No Drawings

WATER SOLUBLE CRAYON COMPOSITION AND METHOD

DESCRIPTION

TECHNICAL FIELD

The present invention relates generally to compositions for solid writing materials, and more specifically to an improved water soluble crayon composition and method of preparing the water soluble crayon composition. The water soluble crayon composition of the present invention comprises an ethoxylated alcohol, a pigment or dye, and, optionally, a water soluble material, such as a polysorbate, and a filler material.

BACKGROUND OF THE INVENTION

Solid marking materials, in the form of crayons, have long been used for writing, drawing and marking on various surfaces, such as paper, plastic, metal, glass, ceramic, rubber and the like. Crayon compositions are known in the art. For example, U.S. Pat. No. 4,212,786 to Murakami ("the '786 patent") discloses a crayon composition comprising resins, derivatives of sorbitols, glycols and pigment.

Japanese Patent No. 58134166 discloses a glittering crayon composition comprising waxy material, a surface active agent, pigment, colorant and a glittering material.

These prior art patents do not, however, disclose crayon compositions having water soluble and washability properties.

It is desirable to make temporary markings with solid marking materials, such as crayons, and it is desirable to readily remove crayon markings from various surfaces with water. Washable crayon compositions and other washable solid marking compositions are known in the art. U.S. Pat. No. 5,084,493 to Olson et al. ("the '493 patent") discloses a water soluble crayon composition and process for making the composition. The composition of the '493 patent is limited to one or more water soluble block polymers characterized by an ABCBA structure.

U.S. Pat. No. 4,840,669 to Hughes et al. discloses water soluble coloring compositions containing a polymeric thickener, water soluble micro-crystalline wax, coloring and sparkle components.

U.S. Pat. No. 4,978,390 to Snedeker discloses a washable solid marking composition, and U.S. Pat. No. 3,993,492 to Woolly discloses a water soluble transfer coating material and articles incorporating the same, which article may be a water soluble crayon. The compositions of Snedeker and Woolly, however, contain polyethylene glycol, a compound which has been found to leave a ghost image on some rough or nonporous substrates, such as soft plastics and rubber, after the mark has been removed with water.

Prior art crayon compositions incorporating water solubility properties do not completely satisfy all desired performance properties, such as marking characteristics, durability and the like. Thus, there is a need for an improved water soluble crayon composition that combines water solubility with desired performance properties. In particular, a combination of desired performance properties can be difficult to attain as a result of the components used in prior art compositions. Although water soluble crayons are known in the prior art, they are deficient not only in their physical properties but also in their marking characteristics. For example, as stated in the '786 patent at column 1, lines 54–60, water soluble crayon compositions containing cellulose resin or vinyl resin will have high hardness, but cannot be smoothly applicable to surfaces. Crayon compositions containing acrylic resins, phenolic resins and the like will have low hardness and are smoothly applicable, but fail to give uniform drawing lines. In addition, as stated in the '493 patent at column 3, lines 38–43, certain waxes or resins may be sufficiently durable or hard but may be sticky, whereas crayons containing different waxes or resins may have less stickiness but also less durability or hardness. Furthermore, as stated in the '786 patent at column 1, lines 60–66, crayon compositions containing cellulose, vinyl, acrylic and phenolic resins, when in a liquid state, often have high viscosity. This may present difficulty in shaping the composition mixture with molds.

There is also a need for an improved water soluble crayon composition that does not leave a ghost image on rough or nonporous substrates, such as soft plastics and rubber, after the mark has been removed with water. In addition, there is a need for an improved water soluble crayon composition that achieves a high degree of washability from fabrics, wallpaper, upholstery, carpets, painted surfaces and other surfaces.

The water soluble crayon composition of the present invention satisfies these needs, and is an improvement over the conventional crayon compositions known in the art. The water soluble crayon composition of the present invention provides a combination of desired performance properties, such as excellent washability and water solubility with little or no ghosting problems, non-toxicity, suitable hardness and durability, excellent adhesion and drawability, little or no stickiness after hardening and mold release, a higher softening temperature than a typical wax crayon, and low viscosity in a liquid state at elevated temperatures for ease in shaping with molds.

Methods for preparing water soluble crayon compositions are also known in the art. Crayons are generally prepared by combining one or more natural or synthetic waxes, such as water insoluble paraffin, carnauba wax, hydrocarbon waxes and the like, in a molten state, adding a coloring agent to the molten mixture, and pouring the resulting composition into a specified mold and solidifying the composition by cooling. The '493 patent discloses processes for the production of water soluble crayon compositions, and for the manufacture of crayons which utilize a mixture of one or more water soluble block polymers characterized by an ABCBA structure.

Thus, the present invention overcomes the deficiencies associated with the prior art by providing an improved water soluble crayon composition that leaves little, if any, ghost appearance, residue or color after the crayon is washed off a surface, that is non-toxic, has suitable hardness and durability, excellent adhesion and drawability, little or no stickiness after hardening and mold release, a higher softening temperature than a typical wax crayon, and has low viscosity in a liquid state at elevated temperatures for ease in shaping.

SUMMARY OF THE INVENTION

The present invention relates generally to compositions for solid writing materials and, more specifically, to an improved water soluble crayon composition and method of making the water soluble crayon composition. The water soluble crayon of the present invention may be used for writing, drawing or marking by children or adults, as a children's toy, for arts and crafts, for industrial marking, as well as for other uses where a temporary mark that can be easily removed with water is desired. The crayon may be marked directly onto a substrate, such as paper, rubber, glass, plastic, metal and wood, or it may be first dipped into water and then used to mark on a substrate. Finally, the substrate may be pre-moistened with water and then marked with the wet or dry crayon.

The water soluble crayon composition of the present invention comprises at least one ethoxylated alcohol; optionally, at least one water soluble material selected from the group consisting of an ethoxylated sorbitan fatty acid ester, ester derivatives thereof, phenols, ethers and polymeric derivatives; at least one pigment or dye; and, optionally, at least one filler. The terms "ester derivatives" and "polymeric derivatives" refer to ester derivatives of ethoxylated sorbitan fatty acid esters and polymeric derivatives of ehtoxylated sorbitan fatty acid esters, respectively. If the water soluble material is used, it serves as a softening agent. The crayon of the present invention does not contain polyethylene glycols and is superior over prior art water soluble crayon formulations containing polyethylene glycols. Such polyethylene glycol-based formulations have been found to leave a ghost image on some rough or nonporous substrates, such as soft plastics and rubber, after the mark has been washed with water. Since the water soluble crayon composition of the present invention contains no polyethylene glycol, however, the crayon composition has exhibited little or no ghosting problems under the same conditions. Thus, markings made with the crayon of the present invention are readily removable from various substrates with water.

It is among the aspects of the present invention to provide an improved water soluble crayon composition comprised of an ethoxylated alcohol, and a pigment or a dye. Optionally, the water soluble crayon composition may include a water soluble material and a filler material. The water soluble crayon composition in accordance with the invention leaves little, if any, ghost appearance, residue or color after the crayon is washed off a surface with water.

It is another aspect of the present invention to provide an improved water soluble crayon composition that is non-toxic, has suitable hardness and durability, excellent adhesion and drawability, and has little or no stickiness after hardening and mold release.

It is another aspect of the present invention to provide an improved water soluble crayon composition which has a higher softening temperature than a typical wax crayon, and has low viscosity in a liquid state at elevated temperatures so that it can be easily shaped in a mold.

It is well known in the art that water soluble crayons such as those of the invention may be made by processes other than molding, including, but not limited to, pressing and extruding processes.

Other advantages and aspects of the present invention will become apparent upon reading the following detailed description of the invention and preferred embodiments of the invention.

DETAILED DESCRIPTION OF THE PREFERRED EMBODIMENT

This invention is susceptible of embodiment in many different forms, including, but not limited to, the preferred embodiment of the invention. The present disclosure is to be considered an exemplification of the principles of the invention. It is not intended to limit the broad aspect of the invention to the illustrated embodiments.

The present invention is directed to an improved water soluble crayon composition and a method of making that composition. The improved water soluble crayon composition is comprised of several components. In the present invention, for a water soluble, solid crayon composition, a suitable approximate range of components, by percentage weight, is as follows:

| COMPONENT | PERCENT BY WEIGHT OF COMPOSITION |
| --- | --- |
| Ethoxylated alcohol | 9%–99.9% |
| Water soluble material | 0%–70% |
| Filler material | 0%–80% |
| Pigment or dye material | 0.1%–80% |

A suitable approximate range of components, by percentage weight of the composition, for the preferred range of components is as follows:

| COMPONENT | PERCENT BY WEIGHT OF COMPOSITION |
| --- | --- |
| Ethoxylated alcohol | 17.5%–35% |
| Water soluble material | 0%–15% |
| Filler material | 60%–70% |
| Pigment or dye material | 1%–5.5% |

The water soluble crayon composition includes at least one ethoxylated alcohol. The preferred ethoxylated alcohol is a mixture of ethoxylated alcohol and an ethene homopolymer. The ethoxylated alcohol comprises nonionic surfactants derived from $C_{30}$, $C_{40}$ or $C_{50}$ average carbon chain length primary alcohols. The chemical formula for the ethoxylated alcohols used in the present invention is $C_2H_5$—$C_nH_{2n}$—$(CH_2CH_2O)_mH$. The type of ethoxylated alcohols used in the chemical composition of the present invention are sold under the trademark UNITHOX TM ethoxylated alcohols, and are manufactured by Petrolite Corporation of Tulsa, Okla. The CAS identification numbers of the ethoxylated alcohol/ethene homopolymer components used to make the composition include ethoxylated alcohol C>30 (CAS#97953-22-5) and ethene homopolymer (CAS#9002-88-4). The UNITHOX TM ethoxylated alcohols can be tailored to yield surface active agents that may be utilized in a wide variety of applications, because the relative efficiency of the hydrophilic and lipophilic portions of the molecules can be controlled by the addition of varying amounts of ethylene oxide. Various physical properties of the UNITHOX TM ethoxylated alcohols used in the present invention are shown in Table 1 below.

TABLE 1

| Property | Test | Units | UNITHOX 480 |
| --- | --- | --- | --- |
| Number Average Molecular Wgt. | Calculation | — | 2250 |
| Ethylene Oxide Content | NMR | % by Wgt. | 80 |
|  | Calculation | moles EO/mol | 40 |
| Hydroxyl Number | ASTM E-222 | mg KOH/g | 21 |
| Melting Point | USP XX | F(C) | 185(85) |
| Color | ASTM D-1500 | — | 1 |
| Flash Point | ASTM D-92 | F(C) | 500(260) |

TABLE 1-continued

| Property | Test | Units | UNITHOX 480 |
|---|---|---|---|
| HLB Value | Calculation | — | 16 |

The most preferred amount of ethoxylated alcohol is in an amount of 33% by weight of the composition. The second most preferred amount of ethoxylated alcohol is in an amount of 17% by weight of the composition.

The water soluble crayon composition also may optionally include at least one water soluble material that functions as a softener and is in the form of a liquid or paste. The amount of water soluble material, if used in the crayon composition, affects the hardness, durability and melting point of the crayon. The greater the amount of water soluble material, the lower the melting point and the softer the crayon. The lesser the amount of water soluble material, the higher the melting point and the harder the crayon. The preferred water soluble material used is an ethoxylated sorbitan fatty acid ester, known as Polysorbate 80. Polysorbate 80 comprises a mixture of polyoxyethylene ethers of mixed partial oleic esters or sorbitol anhydrides. The chemical formula of Polysorbate 80 is $CH_3(CH_2)_7CH=CH(CH_2)_7CO_2C_4H_9$. Polysorbate 80 functions as a softener to make marking with the crayon easier. The most preferred range of Polysorbate 80 is from 0% to about 15% by weight of the composition. The most preferred amount of Polysorbate 80 is in an amount of 13% or less by weight of the composition. The second most preferred amount of Polysorbate 80 is in an amount of 5.9% to 6 by weight of the composition. Various physical properties of the Polysorbate 80 used in the present invention are shown in Table 2 below.

TABLE 2

| Property | Units | Polysorbate 80 |
|---|---|---|
| Boiling Point | °F. | >300 |
| Solubility in Water | at 25° C. | soluble |
| Specific Gravity | at 25° C. | 1.09 |
| Vapor Pressure | mm Hg at 25° C. | <1 |
| Vapor Density | air = 1 | >1 |
| Volatiles | %, by volume | −3 |
| Appearance | at 25° C. | amber liquid |
| Flash Point | PMCC, °F. | >300 |

Other liquid or paste water soluble materials may also function as satisfactory softeners. The water soluble materials used in the present invention include: ethoxylated sorbitan fatty acid esters (T-MAZ 20, 40, 60, 90; TWEEN), sorbitan fatty acid esters (S-MAZ 20, 80, 90; SPAN), glycerol esters (MAZOL 80 MG-K), polyglycerol esters (MAZOL 159), polyethylene glycol esters (MAPEG 400 ML), ethoxylated sorbitol esters, polyethoxylated alkyl phenols, polyoxypropylene-polyoxyethylene block copolymers (Plutonic L-35), polyoxyethylene ethers, and ethoxylated triglycerides.

The water soluble crayon composition also includes a filler material in an amount in the range of from about 0% to about 80% by weight of the composition. Thus, the filler may be omitted from the present invention, if desired. The most preferred amount of filler material is in an amount of about 62% by weight of the composition. The second most preferred amount of filler material is in an amount of about 45% by weight of the composition. The preferred types of filler material used in the present invention include calcium carbonate (CAS#471-34-1) having the chemical formula $CaCO_3$ and magnesium silicate (CAS#14807-96-6) having the chemical formula $MgSiO_4$. It is appreciated that other filler materials which are suitable for use in the invention include mica, various clays, aluminum silicates, silica, and barium sulfate.

The water soluble crayon composition also includes a pigment in an amount in the range of from about 0.1% to about 80% by weight of the composition. The most preferred amount of pigment material is in an amount of about 5.5% by weight of the composition. The second most preferred amount of pigment material is in an amount of about 8% by weight of the composition. It is preferred that the pigment be of a non-toxic character. Dyes are suitable for use in the present invention, but only when the mark made by the crayon may not need to be completely removed. The crayon itself, even with the use of a dye in lieu of a pigment, is water-soluble. A wide variety of pigments meeting the foregoing requirements are available and may be used. Typical pigments used with the present invention include titanium dioxide, benzidine yellow, lithol red and iron blue. The pigment used in the present invention, however, depends on the particular color desired for the water-soluble crayon. Furthermore, pigments may be blended to produce desired shades.

Propyl paraben is preferably added to the composition as a preservative, at a level of approximately ½% by weight.

The following examples illustrate preferred preparations of water soluble crayon compositions suitable for the present invention.

EXAMPLE 1

| Component | Percentage by Weight |
|---|---|
| Ethoxylated alcohol C>30 (CAS #97953-22-5) and ethene homopolymer (CAS #9002-88-4) | 18 |
| Polysorbate 80 (CAS #9005-65-5) | 15 |
| Calcium carbonate (CAS #471-34-1) | 65 |
| Pigment | 2 |

EXAMPLE 2

| Component | Percentage by Weight |
|---|---|
| Ethoxylated alcohol C>30 (CAS #97953-22-5) and ethene homopolymer (CAS #9002-88-4) | 26 |
| Polysorbate 80 (CAS #9005-65-5) | 7 |
| Calcium carbonate (CAS #471-34-1) | 65 |
| Pigment | 2 |

EXAMPLE 3

| Component | Percentage by Weight |
|---|---|
| Ethoxylated alcohol C>30 (CAS #97953-22-5) and ethene homopolymer (CAS #9002-88-4) | 30–35 |
| Calcium carbonate (CAS #471-34-1) | 60–70 |
| Pigment | 1–2 |

EXAMPLE 4

| Component | Percentage by Weight |
|---|---|
| Ethoxylated alcohol C>30 (CAS #97953-22-5) and ethene homopolymer (CAS #9002-88-4) | 18 |
| Polysorbate 80 (CAS #9005-65-5) | 15 |
| Magnesium silicate (CAS #14807-96-6) | 64 |
| Pigment | 3 |

EXAMPLE 5

| Component | Percentage by Weight |
|---|---|
| Ethoxylated alcohol C>30 (CAS #97953-22-5) and ethene homopolymer (CAS #9002-88-4) | 18 |
| Pluronic L-35 (CAS #9003-11-6) (polyoxyethylene-polyoxypropylene block copolymers) | 15 |
| Calcium carbonate (CAS #471-34-1) | 65 |
| Pigment | 2 |

EXAMPLE 6

| Component | Percentage by Weight |
|---|---|
| Ethoxylated alcohol C>30 (CAS #97953-22-5) and ethene homopolymer (CAS #9002-88-4) | 18 |
| Polysorbate 60 (CAS #1338-41-6) | 15 |
| Calciun carbonate (CAS #471-34-1) | 65 |
| Pigment | 2 |

EXAMPLE 7

| Component | Percentage by Weight |
|---|---|
| Ethoxylated alcohol C>30 (CAS #97953-22-5) and ethene homopolymer (CAS #9002-88-4) | 50 |
| Pigment (titanium dioxide) | 50 |

This Example 7 represents approximately the highest loading of titanium dioxide pigment possible in a molded crayon. Higher loadings of titanium dioxide are possible in an extruded or pressed crayon.

EXAMPLE 8

| Component | Percentage by Weight |
|---|---|
| Ethoxylated alcohol C>30 (CAS #97953-22-5) and ethene homopolymer (CAS #9002-88-4) | 94 |
| D & C red #28 alumininum lake dye | 6 |

EXAMPLE 9

| Component | Percentage by Weight |
|---|---|
| Ethoxylated alcohol C>30 (CAS #97953-22-5) and ethene homopolymer (CAS #9002-88-4) | 99.9 |
| Methylene blue dye (CAS #7220-79-3) | 0.1 |

The following Examples 10–13 represent the most preferred embodiments in the four different colors listed.

EXAMPLE 10

| Component | Percentage by Weight |
|---|---|
| Ethoxylated alcohol C>30 (CAS #97953-22-5) and ethene homopolymer (CAS #9002-88-4) | 32.6 |
| Polysorbate 80 | 5.9 |
| Calcium carbonate (filler) | 57.9 |
| Pigment | |
| (titanium dioxide, Whittaker, Clark & Daniels) | 1.54 |
| (iron blue, Hilton Davis) | .34 |
| (D & C red #7 calcium lake dye, Sun Chemical Corp., No. C19-003) | 1.54 |
| Propyl paraben | .5 |

EXAMPLE 11

| Component | Percentage by Weight |
|---|---|
| Ethoxylated alcohol C>30 (CAS #97953-22-5) and ethene homopolymer (CAS #9002-88-4) | 33.5 |
| Polysorbate 80 | 6 |
| Calcium carbonate (filler) | 59.3 |
| Pigment | |
| (titanium dioxide, Whittaker, Clark & Daniels) | .29 |
| (iron blue, Hilton Davis) | .44 |
| Propyl paraben | .5 |

EXAMPLE 12

| Component | Percentage by Weight |
|---|---|
| Ethoxylated alcohol C>30 (CAS #97953-22-5) and ethene homopolymer (CAS #9002-88-4) | 33.5 |
| Polysorbate 80 | 6 |
| Calcium carbonate (filler) | 59 |
| Pigment | |
| (titanium dioxide, Whittaker, Clark & Daniels) | .71 |
| (D & C red #27 aluminun lake dye, Warner Jenkinson) | .34 |
| Propyl paraben | .5 |

EXAMPLE 13

| Component | Percentage by Weight |
|---|---|
| Ethoxylated alcohol C>30 (CAS #97953-22-5) and ethene homopolymer (CAS #9002-88-4) | 33.5 |
| Polysorbate 80 | 6 |
| Calcium carbonate (filler) | 59.1 |
| Pigment | |
| (titanium dioxide, Whittaker, Clark & Daniels) | .45 |
| (D & C red #7 calcium lake dye, Sun Chemical Corp., No. C19-003) | .45 |

-continued

| Component | Percentage by Weight |
|---|---|
| Propyl paraben | .5 |

The particular D&C red #7 calcium lake dye used in Examples 10 and 13 include insoluble barium compounds. As a result of their insolubility, these barium compounds should not be harmful to humans, even if the crayon were inadvertently ingested. Some users, however, may wish to substitute calcium lake dyes that are free of barium to avoid even the suggestion of toxicity.

The following Example 14 is not pourable into a mold, but must be pressed or extruded because of its high solids content.

EXAMPLE 14

| Component | Percentage by Weight |
|---|---|
| Ethoxylated alcohol C>30 (CAS #97953-22-5) and ethene homopolymer (CAS #9002-88-4) | 9 |
| Calcium carbonate | 75 |
| Titanium dioxide | 16 |

The moldable water soluble crayon composition of the present invention is prepared by a method discussed below. The composition in a liquid or paste-like state is mixed at an elevated temperature and is placed into a mold and solidified by cooling. The crayon composition in a liquid or paste-like state has a low viscosity. It is, therefore, advantageously shapable with molds.

The amount of composition prepared at one time is limited to the amount that is to be filled in the molds on a particular day. First, the pre-weighed components of the ethoxylated alcohol and, if used, the water soluble material, preferably polysorbate, are charged together in a 30 gallon stainless steel or aluminum pot. The pot has an air-powered or electric-powered motor with an attached agitator blade for high speed mixing. Steam heat or gas heat may be used to heat and liquefy the contents of the pot. The ethoxylated alcohol, or the ethoxylated alcohol/water soluble material mix, are then melted or melted together, and stirred to a temperature of from about 130° C. to about 140° C. The mixing time for this step averages approximately fifteen minutes to thirty minutes, depending on the size of the batch, heating temperature used and the desired pigment chosen. The ethoxylated alcohol is thoroughly heated and blended, with or without the water soluble material.

Once the ethoxylated alcohol or the mixture of ethoxylated alcohol and water soluble material has attained a temperature of about 130° C., the pre-weighed components of the pigment material and, if used, the filler, are added and mixed into the melted ethoxylated alcohol or the ethoxylated alcohol/water soluble material mixture. If only an ethoxylated alcohol and pigment or dye are used, the ethoxylated alcohol is melted, and the pigment or dye are dispersed into the melted ethoxylated alcohol. The pigment material, ethoxylated alcohol, and the optional filler and water soluble material are mixed together to form a composition mixture. This composition mixture is mixed together at a high speed until color develops in the composition mixture.

The composition mixture is then cooled to a lower temperature of about 100°-120° C. Once the composition mixture has reached a temperature of about 100°-120° C., the composition mixture may be poured, at any time, into a prepared mold for retaining and shaping the composition into the water soluble crayon of the present invention. Of course, other methods of forming these crayons may be used, including, but not limited to, pressing or extruding.

The mold is prepared and cooled with water to 27° C. The temperature of 27° C. is maintained until the composition is poured or pumped into the mold. Any of the molds suitable for the manufacture of crayons may be used, however, and such molds are well known in the art of crayon manufacture.

Each mold is then filled with the composition mixture by pouring or pumping the melted composition mixture over the surface of the mold, and individual rows of tubes of the mold are gravity filled. The tubes are closed at the bottom end via pins having the same outer diameter as the inner diameter of the tubes.

The mold dwell time, or the time from which the mold is filled to when the composition has solidified and the crayon is ejected, is about 12 minutes. The mold dwell time will vary, however, with alternate composition formulations and crayon sizes. In addition, it is noted that the temperatures used in the method of the present invention will vary with alternate formulas and crayon sizes.

Once the crayon compositions have set, dried or solidified in the mold, the pins associated with the tubes are hydraulically raised and the crayons are ejected from the mold.

It will be understood by those skilled in the art that any of the prior art methods of molding crayons may be used for the molding of the crayons of this invention. It will also be understood by those skilled in the art that the present crayons may be made by other methods, such as by extruding or pressing.

It is to be understood that various modifications within the scope of this invention can be made by one of ordinary skill in the art without departing from the spirit thereof. The invention should be defined by the scope of the appended claims as broadly as the prior art will permit, and various changes may be made and equivalents may be substituted for elements thereof without departing from the broader aspects of the invention.

What I claim is:

1. An improved water soluble crayon composition comprising:
   a. about 9% to about 35% by weight of at least one ethoxylated alcohol;
   b. about 0% to about 70% by weight of a water soluble material in the form of a liquid or a paste and selected from the group consisting of ethoxylated sorbitan fatty acid esters, ester derivatives, phenols, ethers and polymeric derivatives; and
   c. at least one pigment or dye.

2. The composition of claim 1, further comprising about 80% by weight or less of at least one filler material.

3. The composition of claim 2, wherein said filler material is in an amount of about 62% by weight of said composition.

4. The composition of claim 2, wherein said filler material is in an amount of about 45% by weight of said composition.

5. The composition of claim 2, wherein said filler material is selected from the group consisting of calcium carbonate and magnesium silicate.

6. The composition of claim 1, further comprising 0.1–80% by weight of at least one pigment material.

7. The composition of claim 6, wherein said pigment material is in an amount of about 5.5% by weight of said composition.

8. The composition of claim 6, wherein said pigment material is in an amount of about 8% by weight of said composition.

9. The composition of claim 1, wherein said ethoxylated alcohol is in an amount of 17.5% by weight of said composition.

10. The composition of claim 1, wherein said ethoxylated alcohol is in an amount of 17% to 35% by weight of said composition.

11. The composition of claim 1, wherein said ethoxylated alcohol is selected from the group consisting of nonionic surfactants derived from $C_{30}$, $C_{40}$ or $C_{50}$ average carbon chain length primary alcohols.

12. The composition of claim 1, wherein said water soluble material is in an amount of about 15% by weight of said composition.

13. The composition of claim 1, wherein said water soluble material is in an amount of about 21.5% by weight of said composition.

14. The composition of claim 1, wherein said water soluble material is an ethoxylated sorbitan fatty acid ester, comprising a polyoxyethylene ether of mixed oleic esters and a polyoxyethylene ether of sorbitol anhydride.

15. The composition of claim 1, wherein said water soluble material is further selected from the group consisting of sorbitan fatty acid esters, glycerol esters, polyglycerol esters, polyethylene glycol esters, ethoxylated sorbitol esters, polyethoxylated alkyl phenols, polyoxypropylene-polyoxyethylene block copolymers, polyoxyethylene ethers, and ethoxylated triglycerides.

16. An improved water soluble crayon composition comprising:
 a. about 9% to 35% by weight of at least one ethoxylated alcohol;
 b. 0% to about 70% by weight of at least one water soluble material in the form of a liquid or a paste and selected from the group consisting of an ethoxylated sorbitan fatty acid ester, ester derivatives thereof, phenols, and polymeric derivatives;
 c. 0% to about 80% by weight of at least one filler material; and
 d. about 0.1% to about 80% by weight of at least one dye or pigment material.

17. The composition of claim 16, wherein said ethoxylated alcohol is in an amount of 17% to 35% by weight of said composition.

18. The composition of claim 16, wherein said ethoxylated alcohol is selected from the group consisting of nonionic surfactants derived from $C_{30}$, $C_{40}$ or $C_{50}$ average carbon chain length primary alcohols.

19. The composition of claim 16, wherein said water soluble material is in an amount of about 0% to 15% by weight of said composition.

20. The composition of claim 16, wherein said water soluble material is in an amount of about 21.5% by weight of said composition.

21. The composition of claim 16, wherein said water soluble material is an ethoxylated sorbitan fatty acid ester, comprising a polyoxyethylene ether of mixed oleic esters and a polyoxyethylene ether of sorbitol anhydride.

22. The composition of claim 16, wherein said water soluble material is further selected from the group consisting of a sorbitan fatty acid ester, a glycerol ester, a polyglycerol ester, a polyethylene glycol ester, an ethoxylated sorbitol ester, a polyethoxylated alkyl phenol, a polyoxypropylene-polyoxyethylene block copolymer, a polyoxyethylene ether, and an ethoxylated triglyceride.

23. The composition of claim 16, wherein said filler is in an amount of about 60% to 70% by weight of said composition.

24. The composition of claim 16, wherein said filler is in an amount of about 45% by weight of said composition.

25. The composition of claim 16, wherein said filler material is selected from the group consisting of calcium carbonate and magnesium silicate.

26. The composition of claim 16 wherein said pigment is in an amount of about 0.1% to 8% by weight of said composition.

27. An improved water soluble crayon composition comprising:
 a. about 17% to about 35% by weight of at least one ethoxylated alcohol;
 b. 0% to about 15% by weight of at least one water soluble material in the form of a liquid or a paste selected from the group consisting of ethoxylated sorbate and fatty acid esters, ester derivatives, phenols, and polymeric derivatives;
 c. 60% to about 70% by weight of at least one filler material; and
 d. about 1% to about 5.5% by weight of at least one pigment or dye material.

28. The composition of claim 27, wherein said ethoxylated alcohol is combined with an ethene homopolymer.

29. The composition of claim 27, wherein said water soluble material is an ethoxylated sorbitan fatty acid ester.

30. The composition of claim 27, wherein said filler material is selected from the group consisting of calcium carbonate and magnesium silicate.

* * * * *